United States Patent
Park et al.

(10) Patent No.: US 8,311,270 B2
(45) Date of Patent: Nov. 13, 2012

(54) DEVICE AND METHOD FOR ARRANGING BLOCK OF VESSEL

(75) Inventors: Jeong-Ho Park, Daejeon (KR); Jong-Hyun Park, Daejeon (KR); Wan Sik Choi, Daejeon (KR); Gwang Ja Jin, Daejeon (KR); Inhak Joo, Daejeon (KR); Seung Yong Lee, Daejeon (KR); Kyong Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 534 days.

(21) Appl. No.: 12/562,069

(22) Filed: Sep. 17, 2009

(65) Prior Publication Data

US 2010/0142750 A1 Jun. 10, 2010

(30) Foreign Application Priority Data

Dec. 8, 2008 (KR) ........................ 10-2008-0124210

(51) Int. Cl.
*G06K 9/00* (2006.01)
*B65H 1/00* (2006.01)
(52) U.S. Cl. ..................... 382/100; 382/291; 414/222.13
(58) Field of Classification Search .................. 382/100, 382/103, 106–107, 155, 162, 168, 170, 173, 382/180, 181, 189, 190, 199, 206, 209, 224, 382/232, 254, 260, 274, 276, 286–298, 305, 382/312; 414/222.13, 341, 137.1; 705/28; 342/357.31
See application file for complete search history.

(56) References Cited

U.S. PATENT DOCUMENTS

| 7,072,102 | B2* | 7/2006 | McGuire, Jr. ................. 359/352 |
| 7,155,406 | B2* | 12/2006 | Kang ............................... 705/28 |
| 7,646,336 | B2* | 1/2010 | Tan et al. .................. 342/357.31 |
| 7,972,102 | B2* | 7/2011 | Ward et al. .................. 414/137.1 |
| 8,079,797 | B2* | 12/2011 | Tanaka et al. ............ 414/222.13 |
| 2008/0166211 | A1* | 7/2008 | Lanigan et al. ............... 414/341 |

FOREIGN PATENT DOCUMENTS

| KR | 10-2004-0110948 A | | 12/2004 |
| KR | 10-2005-0024878 | * | 3/2005 |
| KR | 10-2005-0024878 A | | 3/2005 |
| KR | 10-2005-0082929 A | | 8/2005 |
| KR | 10-2007-0066192 A | | 6/2007 |

* cited by examiner

*Primary Examiner* — Seyed Azarian

(74) *Attorney, Agent, or Firm* — Kile Park Goekjian Reed & McManus PLLC

(57) ABSTRACT

A vessel block arranging device extracts image information on a vessel block loaded on a transporter, and determines whether to arrange the vessel block in an area in which the vessel block will be arranged by using location information of the arranged vessel block in the area and extracted image information, thereby reducing errors caused by determining the vessel block arrangement.

9 Claims, 4 Drawing Sheets

DEVICE AND METHOD FOR ARRANGING BLOCK OF VESSEL

CROSS-REFERENCE TO RELATED APPLICATION

This application claims priority to and the benefit of Korean Patent Application No. 10-2008-0124210 filed in the Korean Intellectual Property Office on Dec. 8, 2008, the entire contents of which are incorporated herein by reference.

BACKGROUND OF THE INVENTION (a) Field of the Invention

The present invention relates to a vessel block arranging method and device.

(b) Description of the Related Art

In general, a sailing vessel is very much bigger than general buildings. Manufacturing it requires a complicated progress, and it undergoes a process for manufacturing by assembling a huge volume of members and devices.

In the construction of the vessel, metal plates are cut to fit partial shapes of the body of the ship, a small assembling factory combines several small members and transfers them to a large assembling factory, and the large assembling factory uses them for part of a vessel block with a height of 16 m. Accordingly, one vessel is completed by cutting the metal plates into about 300 pieces, assembling them into block units of 40 tons each, loading them into the dock, and assembling them.

In this instance, the vessel blocks must be moved to an empty space according to a production schedule in a storage bay that is divided before the vessel is assembled in the dock of a shipbuilding yard. In this case, a person in charge of block disposal determines the disposal location of the vessel blocks by using a storage bay database and standards of the arranged vessel blocks, and hence, the actual corresponding location may not have sufficient space for installing the vessel block. Then, job performance can be deteriorated since the vessel block must be moved to another space.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vessel block arranging method and device having advantages of reducing an error caused by determining vessel block arrangement.

An exemplary embodiment of the present invention provides a method for arranging a vessel block loaded in a transporter in a storage bay, including extracting image information on a vessel block loaded in the transporter, and determining whether to arrange the vessel block in a first area by using location information of the arranged vessel block in an area adjacent to the first area in which the vessel block will be arranged in the storage bay, and the image information.

Another embodiment of the present invention provides a device for arranging a vessel block loaded in a transporter in a storage bay, including: a database for storing location information of a vessel block arranged in the storage bay; an image capture unit for capturing a plain image and a front image of the vessel block loaded in the transporter; a block image processor for extracting shape information of the vessel block from the plain image, and extracting information on at least two feature points of the vessel block from front image information; and a block arrangement determiner for determining whether to arrange the vessel block in a first area by using location information of the vessel block arranged in an area adjacent to the first area in which the vessel block will be arranged, shape information of the vessel block, and standard information estimated from the shape information of the vessel block.

According to an exemplary embodiment of the present invention, since vessel block arrangement errors can be reduced, the vessel blocks can be efficiently arranged.

DETAILED DESCRIPTION OF THE EMBODIMENTS

Figure 1:
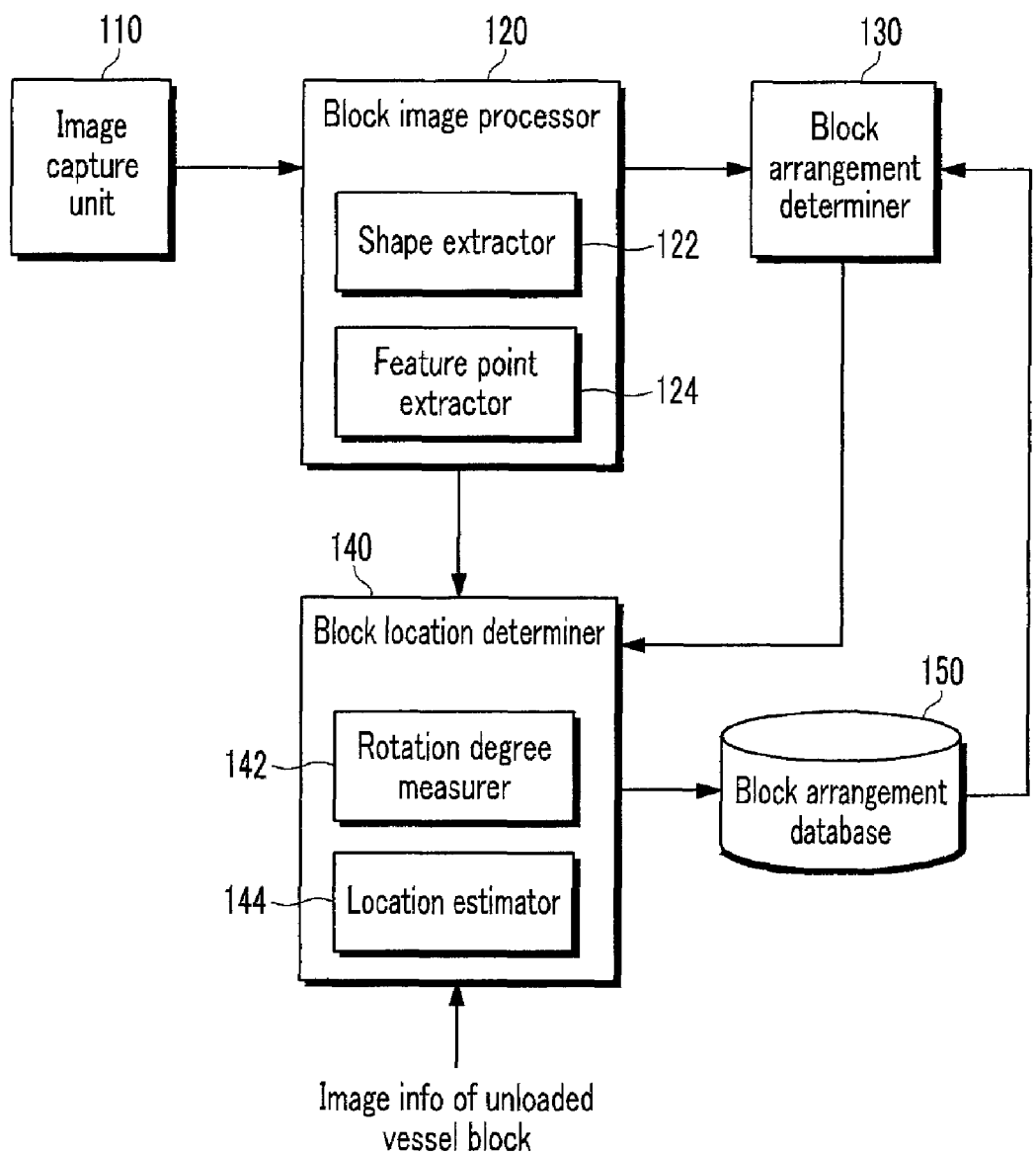
FIG. 1 shows a block diagram of a vessel block arrangement device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A vessel block arrangement method and device according to an exemplary embodiment of the present invention will now be described in detail with reference to accompanying drawings.

Figure 2:
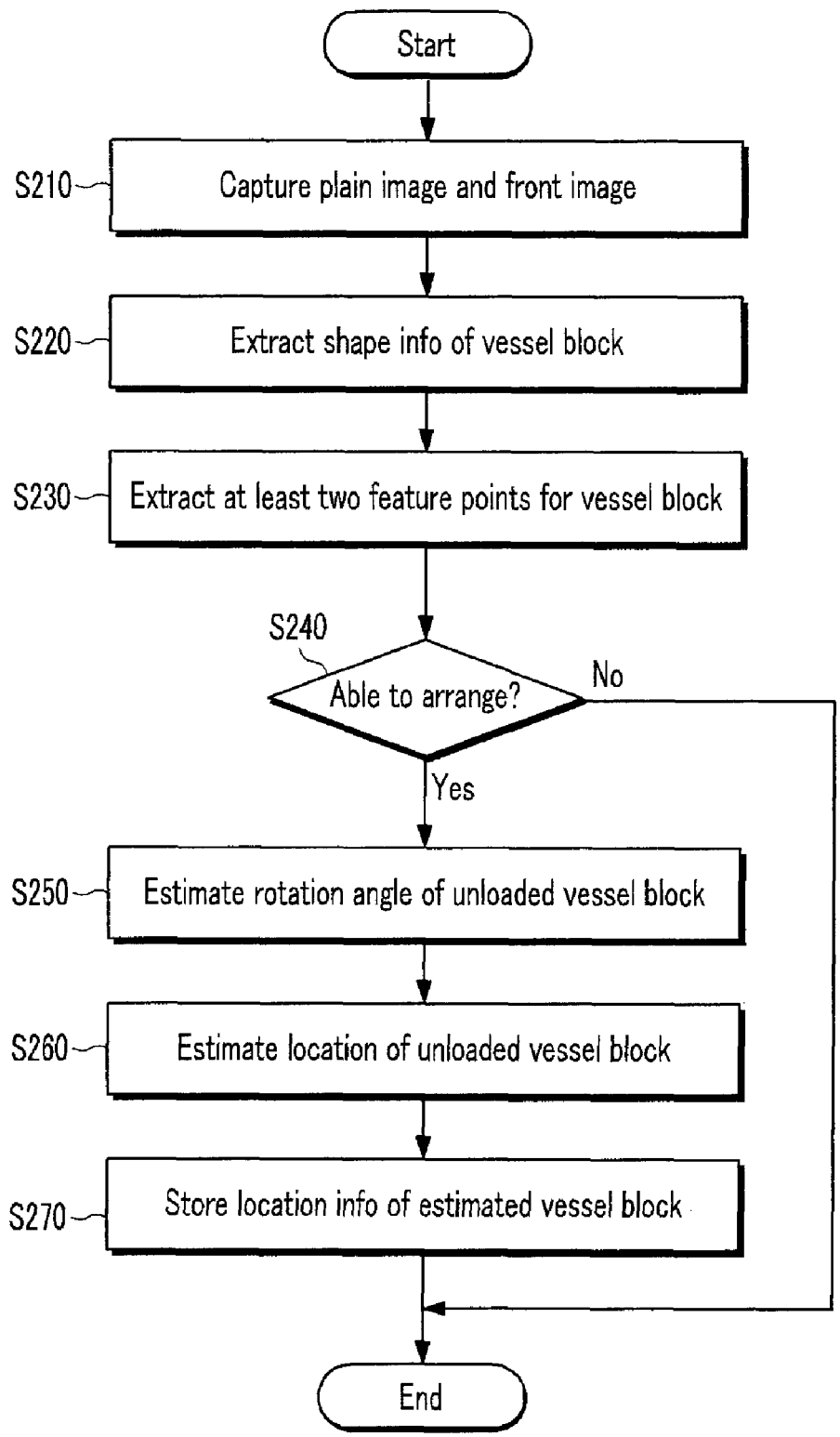
FIG. 2 shows a flowchart of a vessel block arranging method according to an exemplary embodiment of the present invention.
Figure 3:
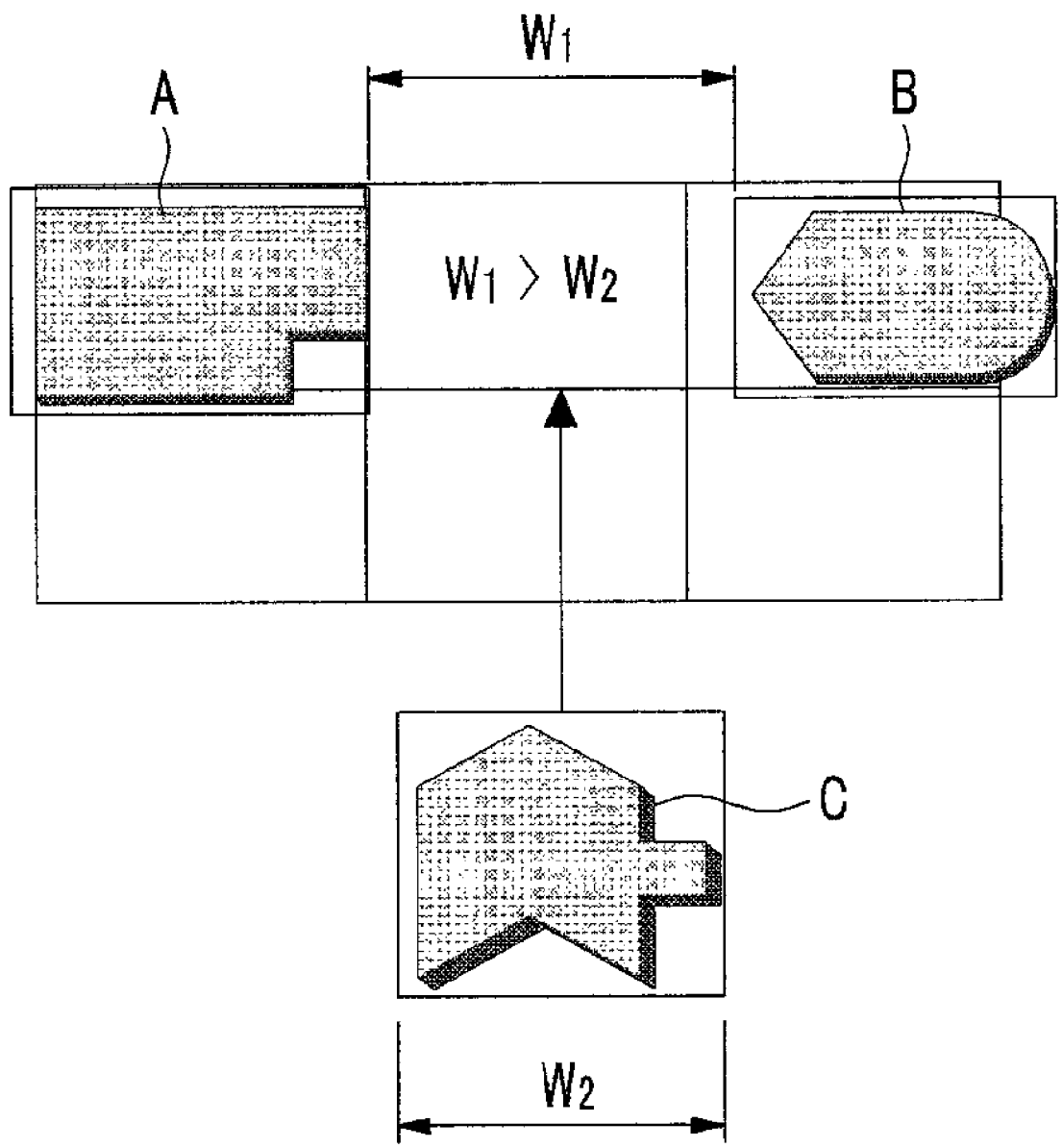
FIG. 3 shows a case of determining the possibility of arranging the vessel block shown in FIG. 2.
Figure 4:
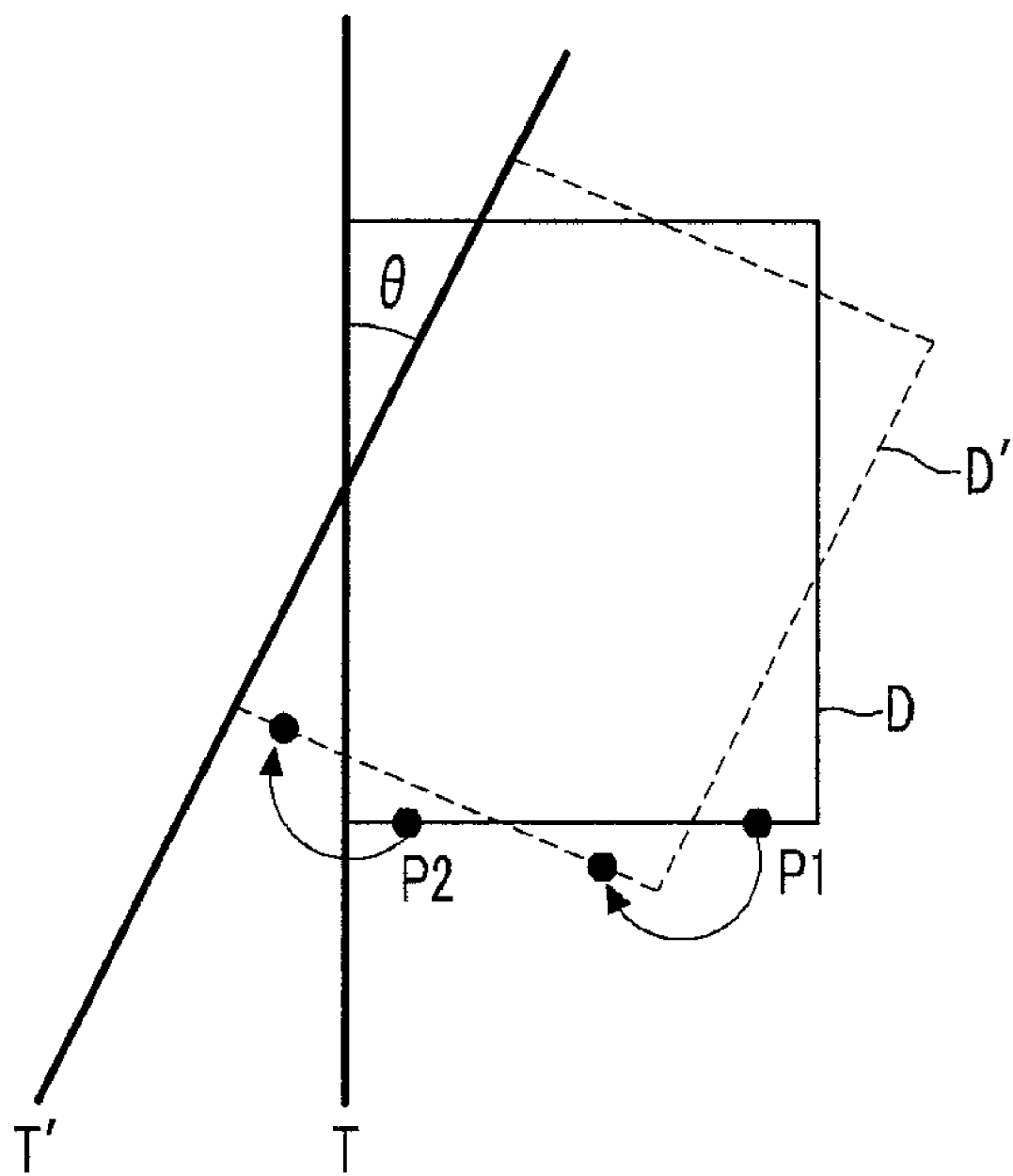
FIG. 4 shows a method for estimating a rotation angle of the vessel block shown in FIG. 2.

FIG. 1 shows a block diagram of a vessel block arrangement device according to an exemplary embodiment of the present invention, and FIG. 2 shows a flowchart of a vessel block arranging method according to an exemplary embodiment of the present invention. Also, FIG. 3 shows a case of determining the possibility of arranging the vessel block shown in FIG. 2, and FIG. 4 shows a method for estimating a rotation angle of the vessel block shown in FIG. 2.

Referring to FIG. 1, the vessel block arrangement device according to an exemplary embodiment of the present invention includes an image capture unit 110, a block image processor 120, a block arrangement determiner 130, a block location determiner 140, and a block arrangement database 150.

Referring to FIG. 2, the image capture unit 110 captures a plain image and a front image of the vessel block loaded in a transporter and transmits the images to the block image processor 120 (S210).

The block image processor 120 includes a shape extractor 122 and a feature point extractor 124.

The shape extractor 122 generates shape information of the vessel block by using the plain image of the vessel block, estimates standard information of the vessel block by using shape information of the vessel block, and transmits the shape information and the standard information of the vessel block to the block arrangement determiner 130 (S220). The shape extractor 122 extracts the part corresponding to the color area of the vessel block through the intelligent segmentation method to generate shape information of the block, and can also generate the shape information of the block by using another method. In this instance, the standard information includes the width and height sizes in the vessel block shape.

The feature point extractor 124 extracts information on at least two feature points from the part with a sharp edge by using the front image of the vessel block, and transmits information on at least two feature points together with the shape of the vessel block generated by the shape extractor 122 and standard information estimated from the shape of the vessel block to the block arrangement determiner 130 (S230).

The block arrangement determiner 130 determines whether the vessel block can be arranged at a predetermined location based on location information of the arranged vessel block and shape and standard information of the vessel block to be arranged from the block arrangement database 150 (S240).

For example, as shown in FIG. 3, when attempting to arrange the vessel block C in the area between the arranged vessel blocks A and B, the space distance $W_1$ between the vessel blocks A and B and the standard information $W_2$ of the vessel block C are compared to determine that the vessel block can be arranged in the area between the arranged vessel blocks A and B when the space distance $W_1$ is greater than the standard information $W_2$. In this instance, the space distance $W_1$ between the vessel blocks A and B can be computed from the location information of the vessel blocks A and B stored in the block arrangement database 150.

When it is determined that the vessel block can be arranged at the predetermined location, the vessel block is unloaded at the corresponding location.

Referring to FIG. 2, the block location determiner 140 stores location information on the unloaded vessel block in the block arrangement database 150. The block location determiner 140 includes a rotation degree measurer 142 and a location estimator 144. The rotation degree measurer 142 receives image information captured at a reference point for the unloaded vessel block, and estimates a rotation angle of the arranged vessel block by using the received image information and information on the at least two feature points of the vessel block loaded on the transporter extracted by the feature point extractor 124 (S250). In this instance, the reference point indicates a point where the location coordinate is predefined, and it is set with regular intervals on the storage bay where the vessel block is unloaded so as to capture the image of the vessel block. The unloaded vessel block can be captured by a camera installed on the transporter for carrying the vessel block.

For example, referring to FIG. 4, when at least two feature points extracted from front image information of the vessel block D loaded on the transporter are P1 and P2 respectively and the reference axis for capturing the vessel block D loaded on the transporter is the axis T, the rotation degree measurer 142 estimates the reference axis T' for capturing the unloaded vessel block by mapping image information of the unloaded vessel block D' on the at least two extracted feature points, and estimates the rotation angle Θ of the vessel block from the reference axes T and T'. In this instance, the reference axis T represents the central line of the vessel block when the vessel block is loaded, and the reference axis T' indicates the straight line for connecting the reference point and the vessel block after the vessel block is unloaded.

Referring to FIG. 2, the location estimator 144 estimates the location of the vessel block by using the rotation angle of the estimated vessel block (S260), and stores estimated location information of the vessel block in the block arrangement database 150 (S270).

The block arrangement database 150 stores location information of the vessel block arranged in the storage bay. The location information can be stored as an absolute coordinate type and a relative coordinate type.

According to the exemplary embodiment of the present invention, when the actual shape of the vessel block is extracted from image information to determine whether to arrange the vessel block based on location information of the vessel block arranged at the arrangement place and extracted image information, the error rate of determining the block arrangement can be reduced.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for arranging a vessel block loaded in a transporter in a storage bay, comprising:
   extracting, using a block image processor, image information from at least one image of the vessel block, wherein the at least one image was captured by an image capture unit when the vessel block was exposed to the image capture unit; and
   determining, using a block arrangement determiner, whether to arrange the vessel block in a first area of the storage bay by using location information of an arranged vessel block in an area of the storage bay adjacent to the first area and the image information.

2. The method of claim 1, wherein the extracting includes:
   capturing the at least one image of the vessel block, wherein the at least one image comprises a plain image and a front image of the vessel block to be arranged;
   extracting shape information of the vessel block by using the plain image; and
   extracting feature point information of the vessel block by using the front image.

3. The method of claim 1, further comprising:
   estimating, using a block location determiner, location information of the vessel block unloaded in the first area when it is determined that the vessel block can be arranged in the first area; and
   storing the estimated location information of the vessel block in a database.

4. The method of claim 3, wherein the estimating includes:
   estimating a rotation angle by comparing image information on the unloaded vessel block and image information on the vessel block loaded in the transporter; and
   estimating location information of the unloaded vessel block from the estimated rotation angle.

5. The method of claim 1, wherein the image capture unit comprises a camera mounted to the transporter.

6. A device for arranging a first vessel block loaded in a transporter in a storage bay, comprising:
   a database for storing location information of a second vessel block arranged in the storage bay;
   an image capture unit for capturing a plain image and a front image of the first vessel block, wherein the plain image and the front image were captured by the image capture unit when the first vessel block was exposed to the image capture unit;
   a block image processor for extracting shape information of the first vessel block from the plain image, and extracting information on at least two feature points of the first vessel block from the front image; and
   a block arrangement determiner for determining whether to arrange the first vessel block in a first area by using the location information of the second vessel block arranged in an adjacent area of the first area, shape information of the first vessel block, and standard information estimated from the shape information of the first vessel block.

7. The device of claim 6, further comprising
   a block location determiner for estimating location information of the unloaded vessel block by using image information of the unloaded vessel block and the information on at least two feature points, and storing the estimated location information in the database after the vessel block that is determined to be arranged in the area is unloaded.

8. The device of claim 7, wherein the block location determiner includes:
   a rotation degree measurer for estimating a rotation angle of the unloaded vessel block by comparing the information on at least two feature points of the loaded vessel block and image information of the unloaded vessel block; and
   a location estimator for estimating location information of the unloaded vessel block by using the estimated rotation angle.

9. The device of claim 6, wherein the image capture unit comprises a camera mounted to the transporter.

* * * * *